United States Patent [19]

Brown et al.

[11] Patent Number: 4,552,194
[45] Date of Patent: Nov. 12, 1985

[54] LOCKING CONFIGURATION FOR A WHEEL RIM FLANGE RETAINING RING

[75] Inventors: Richard P. Brown, Selden, N.Y.; Harold E. Correll, Uniontown, Ohio

[73] Assignee: Goodyear Aerospace Corporation, Akron, Ohio

[21] Appl. No.: 619,665

[22] Filed: Jun. 11, 1984

[51] Int. Cl.[4] ............................................. B60B 25/18
[52] U.S. Cl. ................................ 152/410; 301/35 SL
[58] Field of Search ........ 301/389, 390, 391, 406-410, 301/35 SS, 35 SL; 292/253; 24/201 R; 403/309, 313

[56] References Cited

U.S. PATENT DOCUMENTS

| 1,409,005 | 3/1922 | Jobski | 152/408 |
| 3,608,607 | 9/1971 | Gerbeth | 152/410 |
| 4,209,052 | 6/1980 | French | 152/410 |

FOREIGN PATENT DOCUMENTS

| 642764 | 3/1928 | France | 152/410 |
| 415006 | 9/1946 | Italy | 152/410 |

Primary Examiner—David A. Scherbel
Attorney, Agent, or Firm—P. E. Milliken; L. A. Germain

[57] ABSTRACT

A retaining ring (30) for use in combination with a wheel rim (10) having a separable bead flange (14) to secure the separable bead flange on the rim in the absence of a properly inflated tire is characterized by an inboard facing portion (30a) and an outboard facing portion (30b) and a split in the ring defining terminal ends, (32,33) each terminal end having a circumferentially oriented first bore (36,37) in the inboard facing portion (30a) and a second bore (38,39) in the outboard facing portion (30b) at an angular relationship with respect to the first bore. A groove (40,41)(70,71) in the outer surface of the retaining ring (30) interconnects each first bore with each second bore and a steel lockwire (50) is threaded through the bores from one terminal end to the other and seated in the grooves and the ends of the wire (50a,50b) are twisted together to lock the terminal ends (32,33) in a specific spaced orientation (d) such that the ring may expand a limited amount when subjected to centrifugal forces tending to expand the ring and the wire (50) limits the amount of such expansion and maintains the separable bead flange (14) on the wheel rim (10).

14 Claims, 8 Drawing Figures

LOCKING CONFIGURATION FOR A WHEEL RIM FLANGE RETAINING RING

BACKGROUND OF THE INVENTION

The invention pertains to wheel assemblies and more particularly to a wheel rim wherein an outboard positioned tire bead flange is designed to be separable from the main portion of the wheel rim. The separable outboard bead flange is secured on the wheel rim by means of a retaining ring received within an annular groove in the rim.

More particularly this invention pertains to a unique configuration for a wheel rim flange retaining ring and means to lock the ring on the rim in an emergency situation when such wheel is rotating at high speed, the mounted tire is deflated, and high centrifugal forces are present to throw the retaining ring off of the wheel rim.

In a wheel assembly of this type a deflated tire is firstly mounted on the wheel rim followed by the separable bead flange and finally by the retaining ring. Upon inflation of the mounted tire, the outboard tire bead forces the separable bead flange into contacting and locking engagement with the retaining ring. Alternatively, when the tire is deflated, the retaining ring is firstly removed followed by the separable bead flange and finally the deflated tire.

In the circumstance of a tire blowout when traveling at high speed, the outboard tire bead tends to work inboardly allowing the separable bead flange to follow in the same direction. Accordingly, the forceful engagement between the separable flange and retaining ring is lost and the ring may be thrown off of the wheel rim by the high centrifugal forces which are present. This of course, results in a dangerous and serious situation especially as these type wheel assemblies are used for aircraft applications.

SUMMARY OF THE INVENTION

In light of the foregoing, it is in accordance with one aspect of the invention as object to provide a retaining ring configuration for a wheel assembly having a separable bead flange which configuration provides locking of the retaining ring on the rim in the absence of a properly inflated tire and during the period of high centrifugal force such that the separable bead flange and tire are preserved on the wheel rim.

Accordingly, the invention is directed to a configuration for a split retaining ring having inboard and outboard facing portions and two circumferentially aligned terminal ends, each end characterized by a first bore circumferentially in the inboard portion and a second bore in the outboard facing portion at an angle with respect to the first bore, and a groove in the outer surface of the ring interconnecting the first and second bores, and a length of steel wire threaded into each first bore and out of each second bore and captured in the grooves, the ends of the wire being twisted together such that the terminal ends of the retaining ring are prevented from expanding beyond the limit set by the wire.

BRIEF DESCRIPTION OF THE DRAWINGS

For a complete understanding of the invention, reference should be made to the following detailed description and the accompanying drawings wherein.

DETAILED DESCRIPTION OF THE INVENTION

Figure 1:
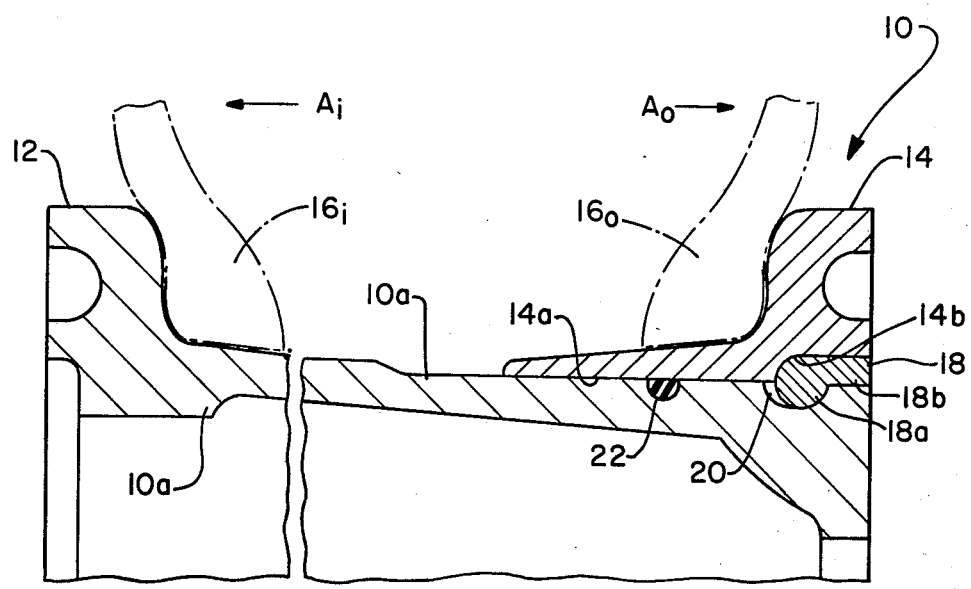
FIG. 1 is a partial sectional view of a typical prior art wheel rim showing a separable outboard bead flange and retaining ring configuration.

Referring firstly to FIG. 1 of the drawings, a prior art wheel rim is generally indicated by reference numeral 10, which wheel rim has designated inboard and outboard directions as indicated by reference arrows Ai and Ao respectively. It should be understood at the outset that FIG. 1 is a generalized showing of a wheel rim having a separable outboard tire bead flange and a flange retaining ring and is not intended to limit the invention to a particular wheel design or individual part configuration, there being numerous such designs within the prior art and known to persons working in the art. This invention therefore, may be applied to many of the prior art configurations. In any event, the wheel rim 10 conventionally includes an inboard tire bead flange 12 which is formed as part of the main body portion 10a of the rim 10 and a separable outboard tire bead flange 14 which is removable from the main body portion 10a in the direction of the arrow Ao. The tire beads are shown via ghost lines as they may be mounted in a tire-inflated condition on the wheel rim 10, the inboard bead being indicated by reference numeral 16i while the outboard bead is indicated by reference numeral 16o.

The separable bead flange 14 is an annular piece that is slidably received on the rim 10 in the inboard direction of arrow Ai and is thereafter retained on the rim by reason of a split retaining ring 18 positioned outboardly of the separable bead flange 14. The retaining ring 18 is characterized by an inboard bulbous portion 18a that is shown having a substantially circular cross-section but may have any geometrical cross-section and a substantially flat lip or flange portion 18b that extends in the outboard direction when said retaining ring is mounted on the wheel rim 10. The bulbous portion 18a is seated in a mating groove 20 provided in the rim 10 while the bore 14a of the separable bead flange 14 has an annular groove 14b which effects an abutting engagement with the retaining ring 18 when forced to move outboardly on the rim as the mounted tire is inflated. An annular seal indicated at 22 may also be provided to maintain the leakproof integrity as between the separable bead flange 14 and the body portion 10a of the wheel rim 10.

From the foregoing description and a consideration of FIG. 1 it will be appreciated that a deflated tire may be easily mounted on the wheel rim 10 in the inboard direction of arrow Ai and thereafter the separable bead flange 14 and retaining ring 18 are mounted on the rim. Upon inflation of the mounted tire, the separable bead flange 14 is moved outboardly by the outboard tire bead 16o to engage the retaining ring 18 in a forceful manner. Seating of the bulbous portion 18a of the retaining ring 18 in the annular rim groove 20 locks the separable bead flange 14 on the wheel rim. Alternatively, it will be appreciated that when the wheel 10 is rotating at high speed, a deflated tire will allow the outboard tire bead 16o to move inboardly which in turn allows the separable bead flange 14 to also move in the same direction. In this circumstance, the locked and abutting engagement between the flange 14 and the retaining ring 18 is lost and the high centrifugal forces which are present will tend to expand the split retaining ring 18 sufficient to throw it free from it's seating in the groove 20 and off of the wheel rim 10. The separable bead flange 14 and tire may then also be forced off of the rim creating a very dangerous situation.

Now therefore, the present invention provides a unique configuration for a retaining ring 18 having means to lock the ring on the wheel rim during the period of high centrifugal force such that the separable bead flange 14 and tire are retained on the wheel rim.

Figure 2:
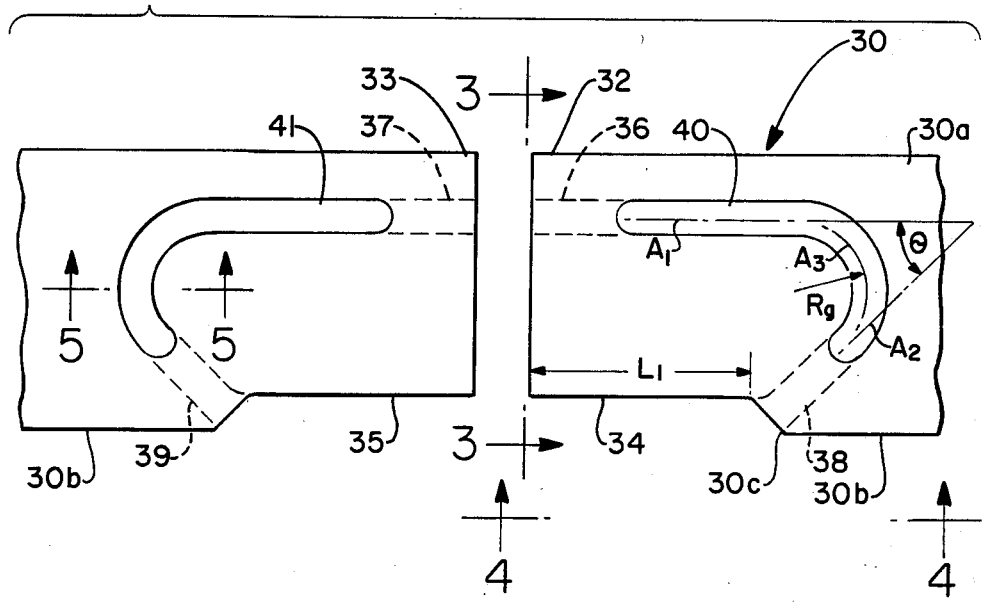
FIG. 2 is a greatly enlarged partial plan view of a wheel rim flange retaining ring in accordance with this invention showing the terminal ends at the point where the retaining ring is split and illustrating a bore and groove configuration for insertion of a lockwire to lock the retaining ring on the rim.
Figures 3, 4:
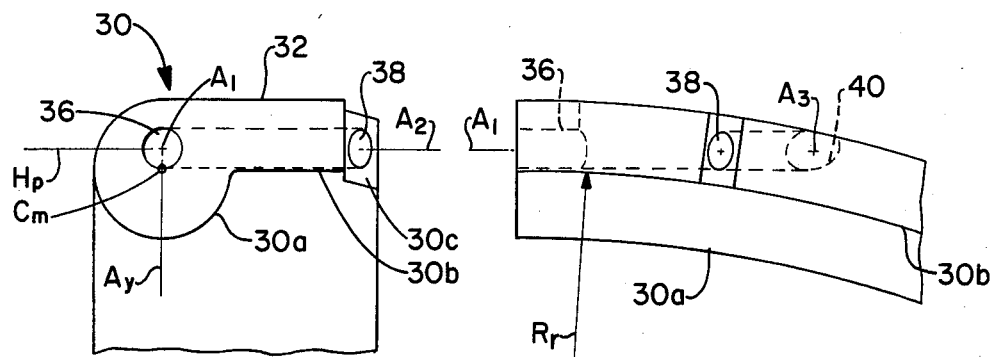
FIG. 3 is an elevational view as may be taken on line 3—3 of FIG. 2.
FIG. 4 is an elevational view as may be taken on line 4—4 of FIG. 2.

Turning now to FIGS. 2, 3, and 4 of the drawings, a split retaining ring according to this invention is illustrated and indicated generally by reference numeral 30. FIG. 2 is a plan view of a portion of the retaining ring 30 in the area where it is split, the terminal ends thereof being indicated by reference numerals 32 and 33 respectively. While the inventive concept may be applied to a retaining ring of any cross-sectional configuration known in the art, it will be described and illustrated particularly with respect to the configuration 18 shown in FIG. 1 of the drawings. Thus, and as clearly illustrated in FIG. 3, the retaining ring 30 is characterized by a bulbous portion 30a and a lip or flange portion 30b. Further, as clearly evident from FIG. 2, the terminal ends 32 and 33 are mirror images of each other and therefore the description will be directed only with reference to the terminal end indicated by numeral 32. The various parts and/or characteristics of terminal end 32 will be indicated by successive even-numbered reference numerals while terminal end 33 will have mirrored parts and/or characteristics indicated by successive odd-numbered reference numerals.

To continue, the terminal end 32 is firstly characterized by a recessed portion 34 which extends into the flange portion 30b of the retaining ring 30 for a length $L_1$ from the end and terminates in a transition surface indicated at 30c. The purpose of the recess 34 in conjunction with the mirrored recess 35 in the terminal end 33 will become apparent hereinafter as the description proceeds. The terminal end 32 is further characterized by a first bore 36 drilled into the end thereof and having it's axis $A_1$ centered on a vertical axis $A_y$ which passes through the centroid $C_m$ of the bulbous portion 30a of the retaining ring 30 as illustrated in FIG. 3 of the drawings. A second bore 38 is drilled into the flange portion 30b of the retaining ring and it has it's axis $A_2$ centered in the transition surface 30c such that it intersects the axis $A_1$ at an angle $\theta$. Because the retaining ring 30 is an annular piece having a radius $R_r$ and from a consideration of FIGS. 3 and 4, it should be obvious that for the two bores 36 and 38 to have their axes $A_1$ and $A_2$ intersect in a common horizontal plane indicated by $H_p$ the location of the $A_1$ axis along the $A_y$ vertical axis and the angular position of $A_2$ as determined by $\theta$ will determine whether or not such axis will indeed intersect in the same $H_p$ plane. For example, the closer $A_1$ is to $C_m$, the smaller the angle $\theta$ is and the greater the distance along the curvature of the ring before the bores 36 and 38 intersect. Alternatively, the farther $A_1$ is from $C_m$ toward the outer surface of the retaining ring the greater the angle $\theta$ and the shorter the distance along the curvature of the ring before the bores 36 and 38 intersect. Finally, the bores 36 and 38 are interconnected by a groove 40 which is milled into the outer surface of the retaining ring. The groove 40 will have substantially the same diameter as the bores 36, 38 and its axis $A_3$ is described by an arc of radius $R_g$ such that the axes $A_1$ and $A_2$ are tangent to $A_3$. This is clearly illustrated in FIG. 2 of the drawing. Accordingly the axes $A_1$, $A_2$ and $A_3$ all lie within the same horizontal plane $H_p$ as shown in FIGS. 3 and 4.

Figure 7A:
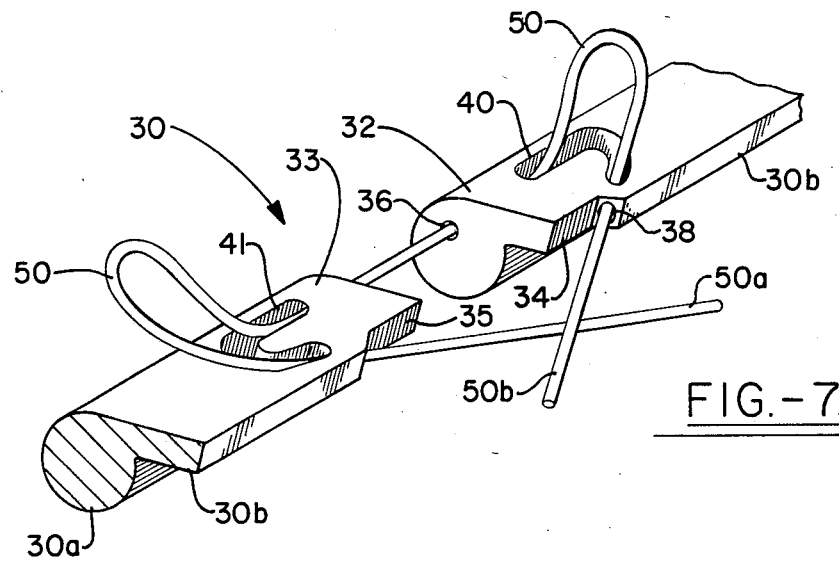
FIGS. 7A and 7B are partial perspective views of the retaining ring configuration shown in FIG. 2 and illustrating the proceedure of locking the retaining ring on a wheel rim.
Figure 7B:
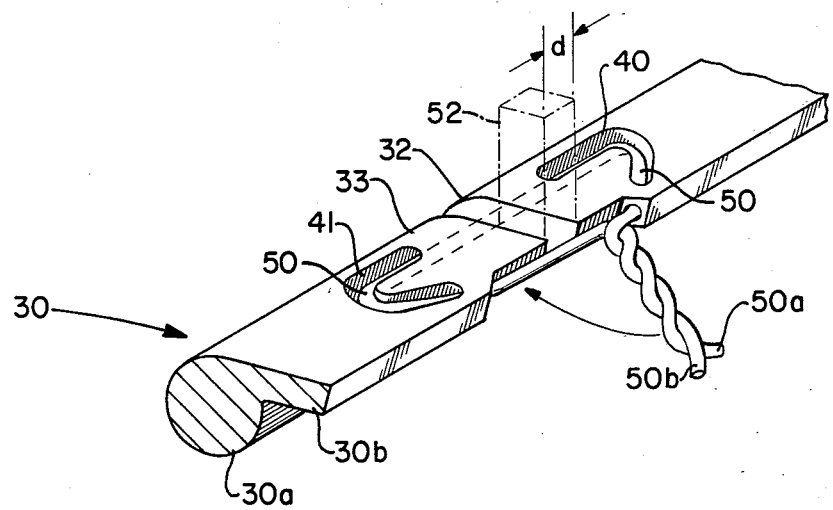

Turning now to FIGS. 7A and 7B of the drawings, the manner of locking the retaining ring 30 on a wheel rim 10 having a separable bead flange 14 will be described. Firstly, a length of steel wire 50 is threaded into the bores 36 and 37 located in the terminal ends 32 and 33 respectively of the retaining ring 30. The retaining ring 30 is split so that it must be spread to mount it on the wheel rim and, once seated in the groove 20, the terminal ends 32 and 33 close again to nearly an abutting relationship with respect to each other. The ends 50a and 50b of the lockwire 50 are then looped back such that they may be threaded out of the bores 38 and 39 as shown in FIG. 7A. A spacer or gauge piece 52 is inserted between the terminal ends 32,33 to force the ends apart a predetermined distance "d" and the lockwire ends 50a and 50b are twisted to lock the terminal ends 32,33 together as much as the spacer 52 will allow. The spacer 52 is removed and the terminal ends 32,33 return to their original positions and the lockwire 50 is trimmed and bent or folded into the space created by the recesses 34 and 35 in the retaining ring flange portion 30b. Finally, the mounted tire is inflated such that the separable bead flange 14 moves outboardly into forceful and locking engagement with the retaining ring 30.

The purpose of the spacer 52 in mounting of the retaining ring 30 is to provide a predetermined amount of expansion of the split retaining ring when it is subjected to initial high centrifugal forces. In this circumstance, the lockwire 50 is not subjected to such initial high forces during this critical period of time. By the time the retaining ring expands sufficiently to totally engage the lockwire, the period of high centrifugal force is passed and the wheel is rotating at a slower rate of speed. It should be appreciated that in this configuration, the outside diameter of the retaining ring 30, prior to centrifugal expansion of the terminal ends 32,33 is no greater than the diameter of the mating groove 14b in the separable rim flange 14 and therefore the retaining ring 30 may be easily rotated by hand within the groove 20 prior to inflation of the mounted tire and engagement with the rim flange 14. This is advantageous in the mounting and demounting procedures of the separable rim flange and retaining ring assembly.

Figure 5:
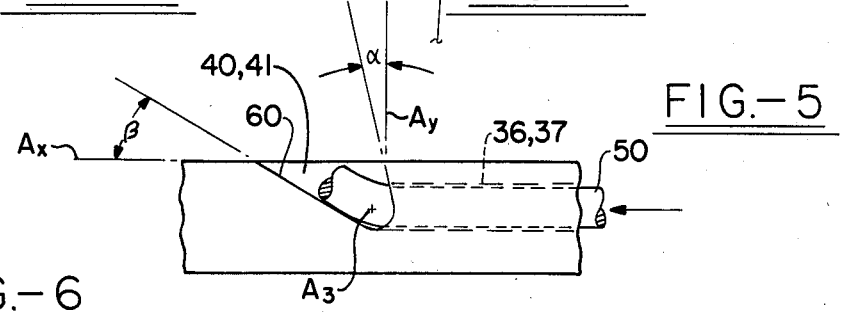
FIG. 5 is an elevational sectional view as may be taken on line 5—5 of FIG. 2 showing a milling angle which may be incorporated into the groove to facilitate threading of the lockwire and to retain it within the groove.

FIG. 5 illustrates a configuration for the milled grooves 40,41 which facilitates threading of the lockwire 50 out of the bores 36,37 and into the bores 38,39 and for seating of the lockwire in the grooves. It is contemplated that an inside milling angle $\alpha$ of less than 10 degrees with respect to the vertical axis $A_y$ will be sufficient to maintain the lockwire within the grooves 40,41 while an outside milling angle $\beta$ of about 30 degrees with respect to the horizontal axis $A_x$ will be sufficient to facilitate threading of the lockwire out of the bores 36,37 and into the bores 38,39. For example, when the lockwire 50 is inserted into the bores 36,37 in the direction of the arrow it will be forced out of the groove by reason of the sloped surface 60 whereupon the wire may be easily grasped and looped back for insertion into the bores 38,39 to exit the flange portion 30b as shown in FIG. 7A.

Figure 6:
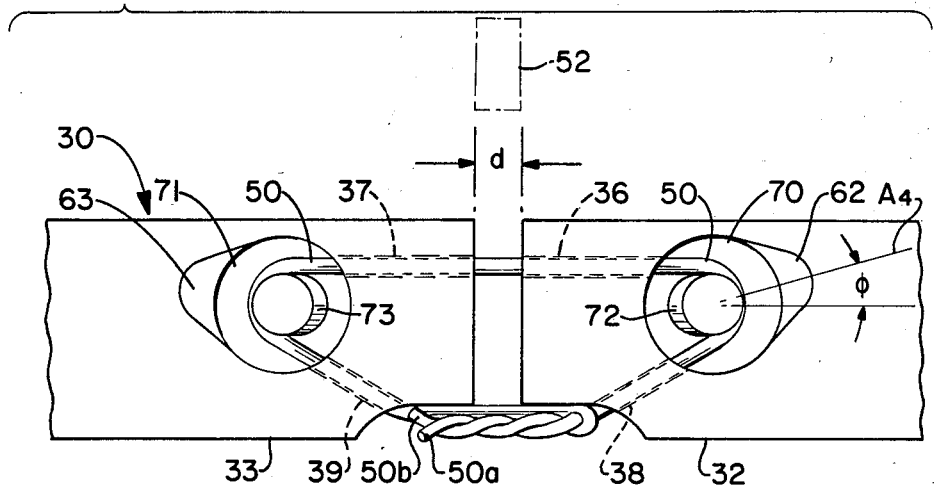
FIG. 6 is a plan view similar to FIG. 2 showing an alternative configuration for a milled groove and illustrating a lockwire mounted therein which secures the retaining ring on a wheel rim in a particular orientation of the terminal ends of the ring.

FIG. 6 illustrates an alternative embodiment of the grooves 40,41. According to this embodiment, a circular milling tool angularly mills out a groove 70 and 71 in the outer surface of each terminal end 32 and 33 respectively. Each circular groove 70,71 is centered such that a respective post 72,73 created by such circular milling is in alignment with the input bores 36,37 and the output bores 38,39. Accordingly, a lockwire 50 is passed about each post 72,73 as it is threaded from each first bore 36,37 to each second bore 38,39. As shown in the drawing, a sloping portion indicated at 62 and 63 may also be milled out of the respective grooves 70,71 so as to facilitate threading of the lockwire. Thus when the lockwire 50 is fed into the bores 36,37 it is directed out of the groove 70,71 such that it may be easily grasped and looped back for threading into the bores 38,39 as shown in FIG. 7A. The sloping portions 62,63 are more advantageously milled on an axis $A_4$ which is at an angle $\phi$ with respect to a line parallel to the $A_1$ axis.

For an appreciation of the relative dimensions of a retaining ring 30 made in accordance with the teachings of this invention and for a particular wheel rim and separable bead flange configuration, the following specifications are applicable:

| | |
|---|---|
| Retaining ring radius $R_r$ = | 19.59 cm (7.714 in.) |
| Axial width of the ring = | 15.875 mm (0.625 in.) |
| Location of $A_1$ from $C_m$ = | 0.94 mm (0.037 in.) |
| Bore diameters of 36,37 = | 1.575 mm (0.062 in.) |
| Bore diameters of 38,39 = | 1.575 mm (0.062 in.) |
| Lockwire diameter (S.S.) = | 1.19 mm (0.047 in.) |
| Angle = | 45° |
| Radius $R_g$ = | 4.28 mm (0.1685 in.) |
| $L_l$ = | 19.12 mm (0.753 in.) |
| Spacer gap "d" = | 6.756 mm (0.266 in.) |

Finally, from the foregoing description it will be appreciated by those knowledgeable in the art that the invention offers various advantages over the present state of the art. For example, the original shape and/or configuration of the retaining ring 18 is fairly maintained i.e., there are no added appendages welded to the ring and no separate complex pieces are required to accomplish the locking arrangement. Further, the lockwire 50 is a readily available stainless steel wire that is relatively inexpensive when compared to other retaining ring locking configurations available in the art. Thus and for safety sake, the lockwire 50 is just used once and discarded upon demounting of the separable bead flange and tire. A new lockwire 50 is used upon remounted of the wheel assembly, which wire exhibits it's full physical strength qualities. Finally, it is important in the aircraft wheel application that a mechanic and/or pilot may easily determine the state of a wheel assembly. Accordingly the twisted ends of the lockwire 50 are easily seen and the absence of a lockwire readily indicated on the fully assembled wheel rim. The absence of a lockwire indicates that, in the event of tire deflation when the wheel is rotating, the retaining ring may not be maintained on the rim to retain the separable bead flange.

While certain representative embodiments and details have been shown for the purpose of illustrating the invention, it will be apparent to those skilled in the art that various changes and modifications may be made therein without departing from the spirit or scope of the invention.

What is claimed is:

1. In a wheel rim assembly having an inboard bead flange and a separable outboard bead flange and a retaining ring having a split defining circumferentially oriented terminal ends, said retaining ring having inboard and outboard facing portions, the inboard facing portion being received within a groove in the rim to secure the separable bead flange on the rim, an improved configuration for a locking retaining ring comprising:

a first bore in each terminal end circumferentially within the inboard portion of the ring;

a second bore in each terminal end in the outboard facing portion of the ring and at an angle with respect to the first bore;

a groove in the outer surface of each terminal end interconnecting each first bore with each second bore; and a continuous length of steel wire threaded through the bores from one terminal end to the other and retained within the grooves, the ends of the wire exiting from the second bores and twisted together such as to limit the extent of expansion of the retaining ring when subjected to centrifugal forces tending to expand the ring.

2. The retaining ring as set forth in claim 1 wherein each bore and each groove has a defined axis and the axes of the first and second bores and interconnecting groove in a terminal end all lie within the same horizontal plane.

3. The retaining ring as set forth in claim 2 wherein the axes of the first and second bores intersect at an acute angle.

4. The retaining ring as set forth in claim 3 wherein a circular arc defines the axis of the interconnecting groove and the axes of the first and second bores are tangent to the circular arc.

5. The retaining ring as set forth in claim 4 wherein the wire comprises a solid stainless steel wire.

6. The retaining ring as set forth in claim 5 wherein the length of the wire establishes a predetermined amount of circumferential expansion of the ring before it limits any further expansion.

7. The retaining ring as set forth in claim 6 wherein the groove is circular providing a center post around which the wire is passed from the first bore to the second bore.

8. The retaining ring as set forth in claim 7 wherein the terminal ends are characterized by a recess in the outboard facing portion of the ring and the twisted ends of the wire are turned into and received within the recess.

9. The retaining ring as set forth in claim 2 wherein the axis of the first bore is located on a line passing vertically through the centroid of the inboard facing portion of the ring.

10. The retaining ring as set forth in claim 9 wherein the axis of the first bore is located at a point on the vertical line which is above the centroid of the inboard facing portion of the ring.

11. The retaining ring as set forth in claim 8 wherein the recess in each terminal end terminates in a transition surface and the axis of the second bore is centered in the transition surface.

12. The retaining ring as set forth in claim 1 wherein the groove is milled into the outer surface at an acute angle with respect to a vertical line to the surface so as to capture the wire within the groove.

13. The retaining ring as set forth in claim 7 wherein the groove is milled into the outer surface at an acute angle with respect to a vertical line to the surface such that the post is vertically oriented away from the terminal end and captures the wire within the groove.

14. The retaining ring as set forth in claim 9 wherein the inboard facing portion has a substantially circular cross section.

* * * * *